July 5, 1960 J. R. CARTWRIGHT 2,943,787

DATA CHECKING APPARATUS

Filed April 2, 1954 2 Sheets-Sheet 1

INVENTOR
JOHN ROBERT CARTWRIGHT

BY

ATTORNEY

July 5, 1960 J. R. CARTWRIGHT 2,943,787

DATA CHECKING APPARATUS

Filed April 2, 1954 2 Sheets-Sheet 2

INVENTOR
JOHN ROBERT CARTWRIGHT
BY Frederick L. Harvey
ATTORNEY

United States Patent Office 2,943,787

Patented July 5, 1960

2,943,787

DATA CHECKING APPARATUS

John Robert Cartwright, Letchworth, England, assignor to International Computers and Tabulators Limited, a British company Filed Apr. 2, 1954, Ser. No. 420,703

Claims priority, application Great Britain May 20, 1953

11 Claims. (Cl. 235—61.7)

This invention relates to a method and apparatus for checking the correctness of data which is recorded, under control of a keyboard, on a card or tape which is to be processed by a statistical or computing machine.

It is normal practice to verify punched record cards before they are used to control tabulating machines, multipliers, etc. That is, one operator punches cards in accordance with the original or source documents and a second operator then checks the source documents against these cards to ensure that the data has been correctly punched. This checking is performed by a verifying machine which indicates when the data entered from the keyboard does not agree with that recorded in the card.

Since the cards may be used many times in compiling various analyses, it is essential that all errors shall be eliminated, but it is apparent that the present procedure nearly doubles the cost of producing correct cards.

It is an object of the present invention to combine the checking of data with the recording operation, so that subsequent verifications of the recording is not necessary.

It is a further object of the invention to provide a card or tape punch which calculates a check code for each item of data which is punched and compares this code with a check code entered on the keyboard of the punch.

It is another object of the invention to employ a prime number, or the product of two prime numbers, as a divisor for calculating the check code.

According to the invention the method of checking the accuracy of data recorded under manual control comprises associating with each item of data, a check code, having a pre-determined relation thereto, entering each data item into a recording device, and a check code calculating device, from a single source, and comparing the entered check code with the calculated check code for agreement. Preferably, apparatus for carrying out the method of the invention has a keyboard for entering the data items and punching means for recording the data items in a card or tape.

The invention will now be described, by way of example, with reference to the accompanying drawings, in which.

Figure 1:
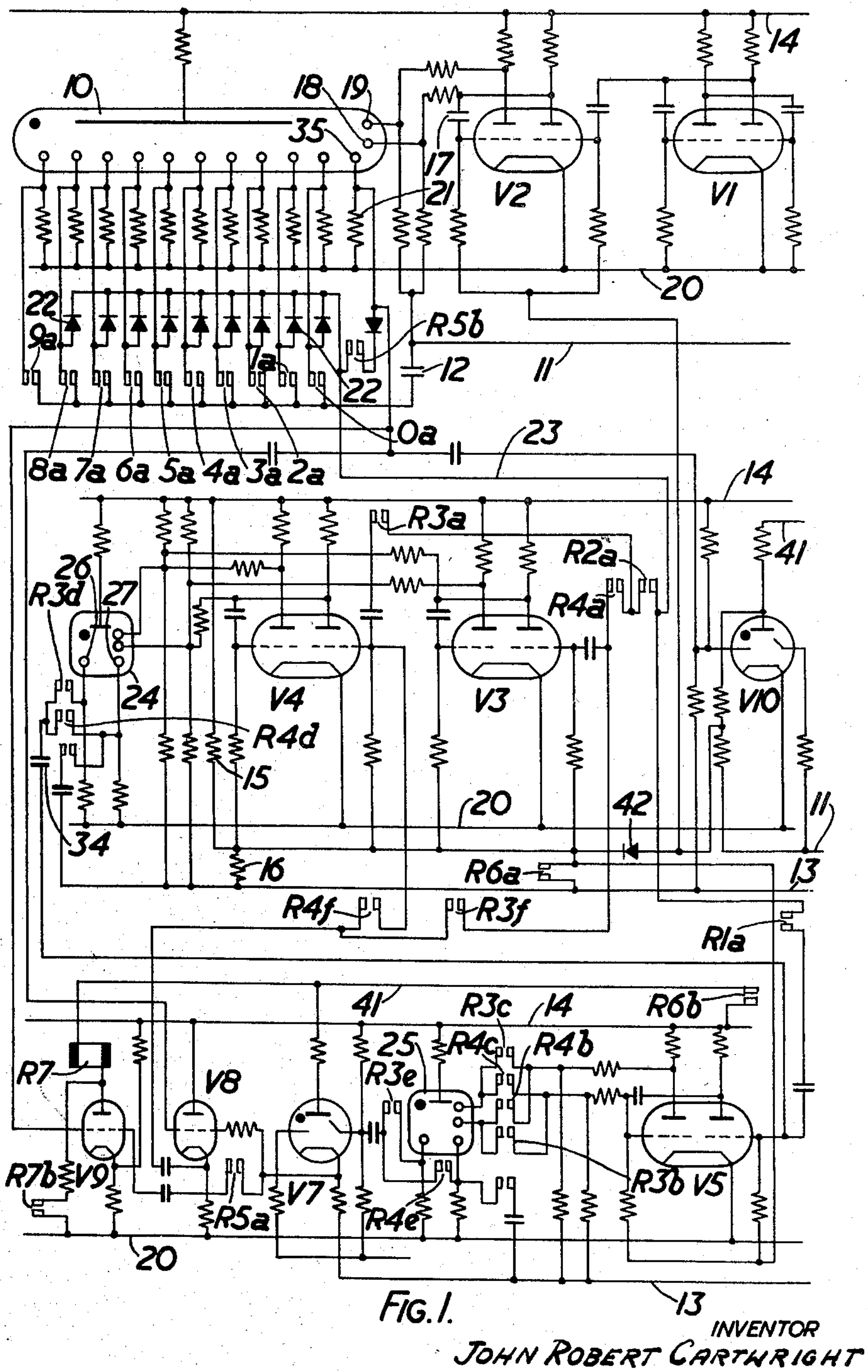
Figure 1 is a circuit diagram of a check code calculator.

It has been found that two main types of error are made in recording data, for example, in punching a record card from the data of a source document. The number 12345 might be punched as 12845 or 12346, in which one digit has been incorrectly recorded. This will be referred to as a single digit error. Alternatively, the number might be punched as 12435 or 21345, in which a pair of adjacent digits have been transposed. This will be referred to as a single transposition error.

Other errors, such as two digits incorrectly recorded, or the transposition of non-adjacent digits, do occur but are far less frequent than the first two types of errors. Naturally, the number and type of error depends to some extent on the proficiency of the punch operator, the legibility of the source documents and other factors. However, a checking system which will find single digit and single transposition errors will prove efficient in practice.

In order to perform this check, a check code is associated with each data item. This check code is the remainder obtained by dividing the data item by a prime number. This may be extended to deal with alphabetic data by allocating numerical values to the letters. Alternatively, the product of two prime numbers may be used as the divisor and the remainder may also be coded to obtain the check code.

In general, the more different values the check code may assume, the greater is the efficiency of the check. In other words, a check code which may have a value from zero to three will detect fewer errors than one which may have values from zero to eleven. On the other hand, it is often desirable to record the check code with the data item and a large check code then reduces appreciably the amount of data which can be recorded on each card.

A further factor to be considered is the relative ease of calculation of the check when various prime numbers are used. These are certain prime numbers for which a "short-cut" method of calculating the remainder may be employed, which avoids an actual division operation. Thus, although any prime number or product of two prime numbers may be used, certain numbers are more suitable than others when the size of the check code and the types of errors to be detected have been specified.

When a high degree of checking, a reasonable size of check code and ready calculation of the check code are required, the use of the prime number 101 as a divisor is advantageous. If the number to be divided is represented as $e\ d\ c\ b\ a$, then the remainder is given by the formula $(a+10b)-(c+10d)+e$. From this formula, it is apparent that the remainder or check code would be altered by any single digit or single transposition error. In fact, it would be altered if $a$, for example, and either $c$ or $d$ were transposed, but not if $a$ and $e$ were transposed.

It will be appreciated that no practical checking system can guarantee to find every error or combination of errors for two reasons. Firstly, the check code must comprise fewer digits on the average than the data item, otherwise the check reduces effectively to recording each data item twice. Because of this, the check code has fewer possible combinations than the data item and therefore cannot check every error. Secondly, the apparatus used for checking may develop a fault which compensates for some particular error in recording and therefore passes the recording as correct. Consequently, it is necessary to strike a balance between the degree of checking obtained and the cost of the checking procedure.

The method of applying the check is to associate a check code with each data item on the source document to be checked. If the data item is indicative information, such as a part number or customer number, the coding needs to be done once only, the check code forming part of the new number. For example, part numbers may be coded as shown below, the last two digits of the new number being the check code. The new number is then used as the standard part number when the checking procedure is instituted.

| Old Part No. | New Part No. |
|---|---|
| 0012 | 001212 |
| 0174 | 017473 |
| 0714 | 071407 |
| 1516 | 151601 |
| 6511 | 651147 |

Additive information, such as amounts and prices, is normally "pre-listed," that is, it is totalled on a keyboard adding machine to provide a total for control purposes during subsequent statistical and accounting operations. The check codes for these data items may be calculated and added to the source document at this time. It is convenient to treat the digits of a sterling value as the digits of a decimal number for the calculation of the check code. Thus the value £10–13–2 is regarded as 10132.

The data items, together with the check codes, are punched in a card in the usual way, however, the keyboard also controls a check code calculator which recalculates the check code for a data item as it is entered on the keyboard. When the check code is entered on the keyboard, the calculator is controlled to compare this with the re-calculated check code. If the two check codes do not agree, it indicates that an error has been made in punching and the card is ejected, or marked, to indicate that it is incorrect.

In order to conserve card capacity, the check code is limited to two digits. Thus the check code 100 is recorded as 00. This reduces the checking efficiency slightly, but this is outweighed practically by the saving which is obtained in the number of card columns.

It should be noted that an error in coding the source document can also be found. For example, if the part number 651147 were incorrectly written as 651117 or 561147, then the error would be found in the same way as if the number had been correctly written and incorrectly punched.

The invention will now be described as applied to a card punch of the type described in British patent specification No. 562,278. Errors are assumed to be due to the punch operator, not to malfunctioning of the card punch itself. For this reason it is assumed that the data which is actually recorded in the card is the same as that entered on the keyboard, so that the keyboard is used to control the check code calculator.

Each of the keys 0 to 9 of the auxiliary keyboard of the reference patent is provided with an extra contact *0a* to *9a* (Figure 1). These contacts select which cathode of a multi-cathode gas discharge valve 10 carries the discharge path. This type of discharge valve is described in an article entitled "The Dekatron," by R. C. Bacon and J. R. Pollard, in "Electronic Engineering," dated May 1950.

When one of the keys is depressed to close the key contacts, the corresponding cathode is connected to a negative supply line 11 through a condenser 12. This puts a large negative pulse on the cathode and forces the discharge to locate itself on this cathode irrespective of its previous location.

The purpose of the discharge valve 10 is to produce a number of pulses equal to the value of the key which has been depressed. A double triode V1 is connected as a free-running multi-vibrator with a repetition frequency of approximately 1000 cycles per second. The square wave output is applied to a second double triode V2 which acts as a driver for the valve 10. Both halves of V2 are held well below cut off by the normally closed contacts R6*a* of a start relay R6 (Figure 2) connecting the grids to a negative supply line 13. When the start relay is energised, the grids rise to a potential, just below cut off, which is determined by a potentiometer, between positive supply line 14 and the negative line 13, formed by resistance 15 and 16. The positive going square waves from V1 now drive V2 into conduction. The time constants of the multi-vibrator circuit are such that the positive part of the square wave is approximately half the duration of the negative part.

The construction of the discharge valve is such that the application of a negative pulse to a guide 18, followed by a negative pulse to a guide 19 causes the discharge to move from which ever cathode it is on to the next cathode to the right. When the right hand half of V2 conducts due to the positive going square wave, the anode potential drops and reduces the potential of the guide 18. When the square wave goes negative, the potential rises again and this rise is applied to the left hand grid via a condenser 17 to drive this half into conduction and so reduce the potential on the guide 19. Thus one cycle of the multi-vibrator causes the discharge to step from one cathode to the next in the valve 10. Each cathode is connected to a ground line 20 via a resistor 21. Hence the cathode on which the discharge is located rises in potential due to the discharge current flowing through the resistor.

The cathodes controlled by the contacts *8a* to *0a* are connected to a common line 23 via isolating rectifiers 22. The discharge moves from a cathode to the guide 18, to the guide 19 and then on to the adjacent cathode. Thus, a positive pulse is produced on the line 23 each time the discharge moves on to a cathode and off it again. For example, if the contacts *3a* are closed, the discharge is initially located on the fifth cathode from the right and by the time that the discharge has reached the last cathode 35, the line 23 will have been pulsed positively three times.

Two gas discharge valves 24 and 25, each having ten cathodes, are used for calculating the units and tens digits respectively of the check code. The valve 24 is controlled by two double triode drivers V3 and V4. When V3 is operated the pulses applied to the guides of the valve 24 are such that the discharge is shifted from the 9 cathode 27 to the 8 cathode and so on to the 0 cathode 26, that is the entry is subtractive. When the valve V4 is operated the discharge is shifted in the opposite direction so that the entry is additive. The valve 25 is controlled by a single driver valve V5. Addition or subtraction is controlled by contacts R3*b*, R3*c*, R4*b* and R4*c* which reverse the connections between the anodes of V5 and the guides of the valve 25.

Relays R1, R2, R3 and R4 (Figure 2) control the entry of the values entered on the keyboard into the valves 24 and 25. These relays are energised by plug connections (not shown) between sockets 28 and sockets 29 which are connected to segments 30 forming part of the column selector of the punch. As the card is stepped along in the punch, brush 32 connects the segments 30 in turn to the common bar 31. The relays R1 to R4 are connected to the sockets 28 through isolating rectifiers 33 in such a way that a pair of relays is energised each time a circuit is made to one of the sockets 28. The relays R1 and R2 control whether entry is made to the valve 25 or the valve 24 respectively. The relays R3 and R4 respectively control whether the entered value is added or subtracted. The plugging to the column selector is so arranged that the right hand socket 28 is energised when the units value or amount to be punched is entered on the keyboard. The next socket is energised when a tens value is entered and so on. Thus the units value is entered subtractively into the valve 24 and the tens value is entered subtractively into the valve 25. The hundreds and thousands value are entered additively into the valves 24 and 25 respectively. It will be noted that the sign of the entered values has been reversed as compared with the formula previously given. This is to facilitate checking that the check code entered from the source document is equal to the calculated check code. The two stage counter formed by valves 24 and 25 is always reset to a count of ninety nine and the check code from the source document is entered additively, so that if the two codes agree the counter should be once again registering ninety nine when a number and its check code have both been entered. One pulse is then entered additively into the counter and this will produce a carry from the tens denomination valve 25 if the two check codes are in agreement.

The pulses on the lines 23 which represent the digit entered on to the keyboard are routed to one of the valves V3, V4 or V5 by contacts R1*a*, R2*a*, R3*a* or R4*a* depending upon the denominational value of the digit. These three valves operate in the same way as the valve V2 in producing driving pulses from the two gas discharge valves, the direction of stepping of the discharge being controlled by which of the pair of guides is pulsed first.

Contacts of the relays R3 and R4 also control the carry circuit of the counter. Contacts R3*d* and R4*d* connect either the 0 cathode 26 or the 9 cathode 27 via a condenser 34 to the driver valve V5. Thus the valve 25 is stepped one position by the positive pulse applied to V5 when the discharge passes to the cathode 26 on adding or to the cathode 27 on subtracting. In a similar way contacts R3*e* and R4*e* pass a positive pulse from either the 0 cathode or the 9 cathode of the valve 25 to a gas trigger tube V7. If the valve V7 is fired it raises the grid potential of a cathode follower V8 and allows it to pass a pulse which occurs when the discharge reaches the last cathode 35 of the valve 10. The output pulse of the cathode follower is fed to one or other of the driver valves V3 or V4 depending upon whether the circuit is set for addition or subtraction via contacts R3*f* and R4*f*. The carry is subtracted if the circuit is set for adding, and is added if the circuit is set for subtracting. This carry with reversed sign from the tens to units denominations of the counter arises from the fact that the counter carries at 100 whereas the basis for the check code is 101.

Figure 2:
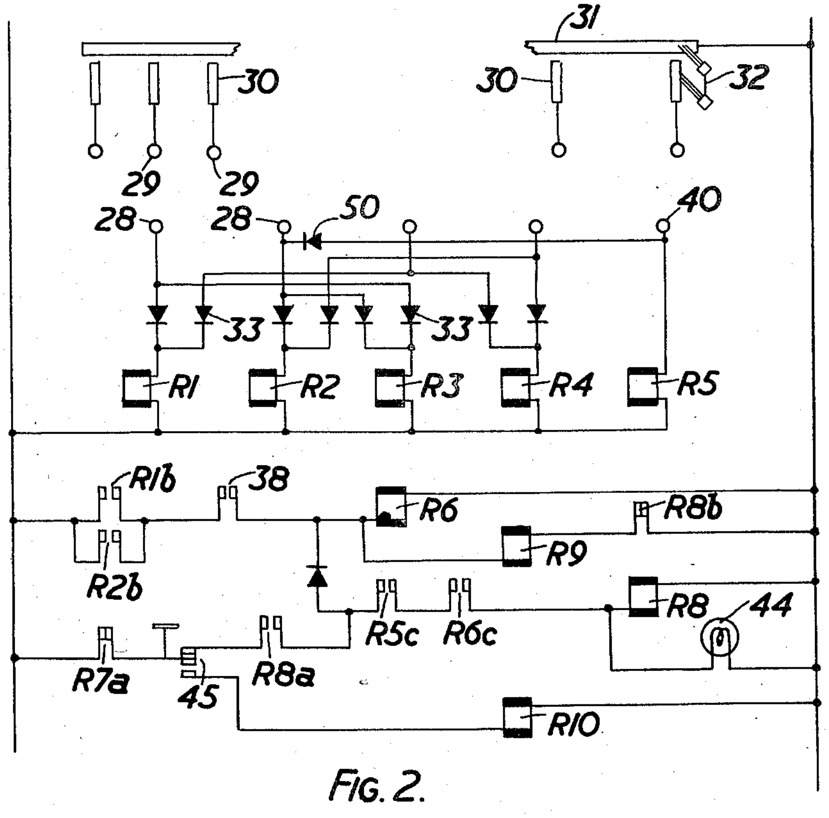
Figure 2 shows the relay control circuits.

The pulse producing and counting circuits are activated by energisation of a relay R6 (Figure 2). This is energised through either contacts R1*b* or R2*b* and contacts 38 which are closed by a punch interposer bar. Contacts R6*a* open to reduce the bias on the valves V2, V3, V4 and V5, to allow the valve 10 to produce a train of pulses representative of the digit and to allow these pulses to cause entry in the counter.

Contacts R6*b* close to connect the positive line 14 to a line 41 which applies anode potential to the trigger valve V7 and also to a second trigger valve V10. This latter valve prevents re-cycling of the valve 10. A pulse is applied to the trigger electrode from the last cathode 35 of the valve 10. This pulse fires the valve V10, reducing the anode potential and consequently the potential of the grids V2 which are connected to a point on a potentiometer between the anode and the line 11, sufficiently to prevent V2 being operated by the output of the multivibrator. A rectifier 42 prevents the fall in potential being applied to the grids of V3, V4 and V5.

When the contacts 38 re-open due to the operation of a punch plate magnet R9, the relay R6 is de-energised, the contacts R6*a* open to bias off the valves V2, V3, V4 and V5 and the contacts R6*b* open to de-ionise the valves V7 and V10. The use of an electronic counter and pulse generator enables the code calculation to take place during the time the contacts 38 are closed, that is whilst punching is taking place, so that the punching operation is not slowed down.

The socket 29 corresponding to the last column of a field, that is to the units digit of the punched check code, is connected to a socket 40 (Figure 2). When the card reaches this position, a relay R5 is energised by the column selector. Contacts R5*b* (Figure 1) close and allow the pulse from the last cathode of the valve 10 to be fed to the valve V4, since the relays R2 and R3 are also energised through a rectifier 50, no connection being made to the sockets 28 for this column.

As already explained, if the two check codes agree, the counter will be registering 99 after the digit pulses for this column have been added. The extra pulse through the contacts R5*b* cause a carry from units to tens and then from the tens denomination. This latter carry causes V7 to fire and the resulting rise across the cathode load is fed to a valve V9 via contacts R5*a*. The grid of this valve has already been brought to just below cut off by the rise in potential of the cathode 35. Hence the valve V5 now conducts and energises a relay R7, which is in the anode circuit of the valve. This relay closes contacts R7*b* to provide a holding circuit.

When the relay R6 operates on this column, it completes a circuit through contacts R5*c* to a relay R8, which establishes a holding circuit through contacts R7*a*, error key contacts 45 and contacts R8*a*. If the punching is correct, however, this circuit is almost immediately broken by the energisation of the relay R7.

When an error has been made in punching, a carry does not occur and the relay R7 is not energized. Consequently, the relay R8 remains energized and opens contacts R8*b* to prevent energisation of the punch plate magnet R9. This prevents further punching taking place and the card cannot be stepped along. A signal lamp 44 is lit to indicate an error has been detected. Equally well, a known device could be operated to mark the card to indicate that it is correct.

The error key has to be depressed to deenergise the relay R8 and the contacts 45 then make a circuit to a magnet R10 which causes automatic ejection of the card.

It is not essential that the check code is punched in the card. Instead, a relay may be energised at the end of the number field, and its contacts used to disconnect the keyboard from the punch selector magnets whilst the check code is entered on the keyboard. The check code calculator then operates as already described, but the punching of the code is suppressed. The circuit for operating the relay R6 is also modified to allow for the fact that the contacts 38 are not closed during check code entry.

The column by column control may be effected by a programme card instead of by the column selector. A punch using such a programme card is shown and described in British patent specification No. 684,273. This specification also shows a full typewriter style keyboard used for punching alphabetic data. The check code may be extended to cover this punching by allocating the values 10, 20 and 30 to the index point positions O, X and Y used in the alphabetic code. Thus the letter N, for example, would have a check code of 25, since it is represented by punching the X and 5 positions for a column. Each of the alphabetic keys controls two contacts, to enter the check code into both the units and tens denomination for each letter.

Under certain conditions the product of two prime numbers may be advantageous as a basis for the check code. An example of this is the number 33. The formula for calculating the remainder is $$(a+10b)-(c+10d)+e$$

It is apparent that the circuit already described is easily modified to deal with this formula by entering all the digits of the number subtractively.

This method may be further modified to yield a single digit check code by subtracting the tens digit of the calculated check code from the units digit. Naturally this form gives a lower efficiency of checking than those previously described, but this may be outweighed in some applications by the saving of space required on the card for recording the check code.

If it is desired to check the operation of the punch as well as the correctness of the entered data, the check code calculator is controlled by a sensing station located beyond the punching position, instead of by the keyboard. The sensing station used for gang punching in the punch shown and described in British patent application No. 25,351/51 may be used to control the check code calculator, so that the data actually punched in the card is checked.

What I claim is:

1. An apparatus for checking the accuracy of data recorded by punching a card or tape, comprising a keyboard for entering a data item and a check code having a predetermined relation to said item, a punching mechanism for recording the data item under control of the keyboard, separate counter means for calculating a check code, said counter means being operated under the direct control of the keyboard, said keyboard being connected to enter the check code through the keyboard under the control of the punching mechanism, means automatically connecting said keyboard to control the punching mechanism and the check code calculating means respectively, and means for determining whether the entered and the calculated check codes are in agreement.

2. Apparatus as claimed in claim 1 having means controlled by the keyboard for entering values into the counter means, to calculate the check code, the value entered depending both upon the character and upon the relative positioning of the character in the data item.

3. Apparatus as claimed in claim 2 in which the value allocated to a character is entered into the counter means if the character is in one position in the data item and the character value multiplied by a fixed factor is entered if the character is adjacent to said position.

4. Apparatus as claimed in claim 3, in which the sign of the value entered is dependent upon the relative position of the character in the data item.

5. Apparatus as claimed in claim 1 having means for feeding the card or tape column by column for each character punched, circuit selecting means operated by the feeding means and means controlled by the circuit selecting means and by the keyboard for entering values in the counter means.

6. Apparatus as claimed in claim 5 having a two denomination electronic counter, pulse generating means controlled by the keyboard and means controlled by the circuit selecting means for directing the pulses produced by the pulse generating means to either denomination of the counter and for determining whether the entered values are added or subtracted.

7. Apparatus as claimed in claim 6 having a decimal counter, means for resetting the counter to register ninety-nine before the entry of each data item, means for adding the check code entered on the keyboard to the calculated check code registered in the counter, to provide a registration of ninety-nine if the entered and calculated check codes are in agreement, means under control of the circuit selecting means for subsequently adding unity into the counter and means operated by a carry from the second denomination of the counter.

8. Apparatus as claimed in claim 7 having comparing means operated on agreement between the entered and calculated check codes and means controlled jointly by the circuit selecting means and by the comparing means for performing a first operation on the card or tape if the comparing means is operated and for performing a second operation if the comparing means is not operated.

9. Apparatus as claimed in claim 8 in which each denomination of the counter comprises a multi-electrode gas filled counting tube.

10. Apparatus as claimed in claim 9 having a driving circuit for applying pulses to be counted to a pair of guide electrodes of a counting tube and means for interchanging the connections between the driving circuit and the guide electrodes to effect addition or subtraction.

11. Apparatus as claimed in claim 10 in which the means for interchanging for the guide electrode connections also conditions carry circuits of the tube for addition and subtraction respectively.

References Cited in the file of this patent

UNITED STATES PATENTS 2,684,199 Starreveld ------------- July 20, 1954